Figure 1:
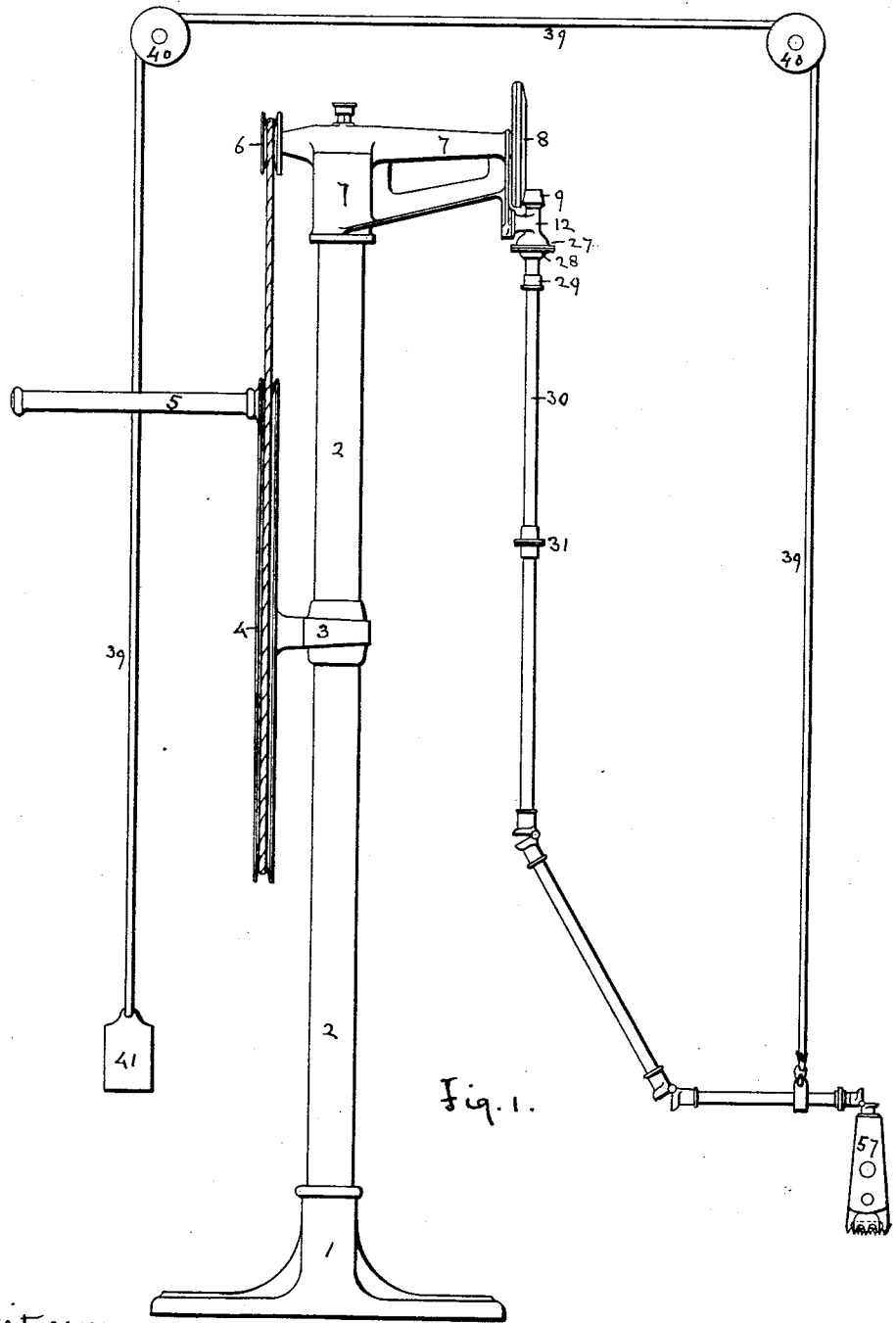

(No Model.) 4 Sheets—Sheet 1.

J. W. NEWALL.
ANIMAL CLIPPING MACHINE.

No. 541,288. Patented June 18, 1895.

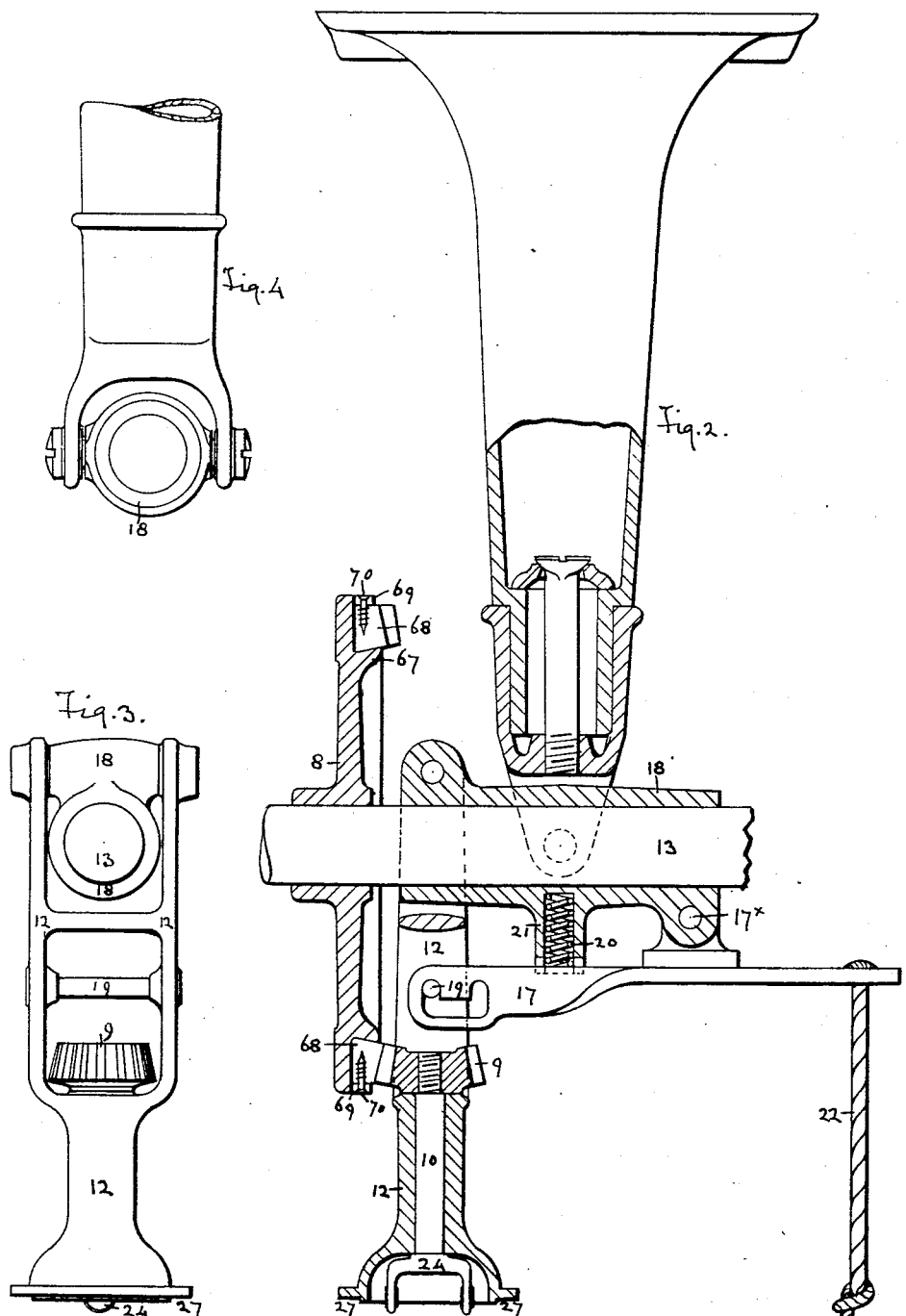

(No Model.) 4 Sheets—Sheet 3.
J. W. NEWALL.
ANIMAL CLIPPING MACHINE.
No. 541,288. Patented June 18, 1895.
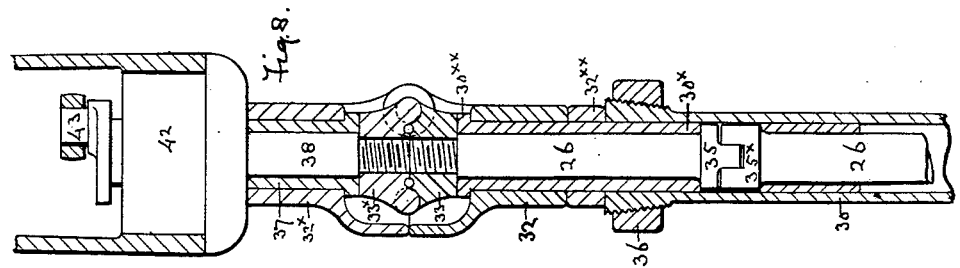
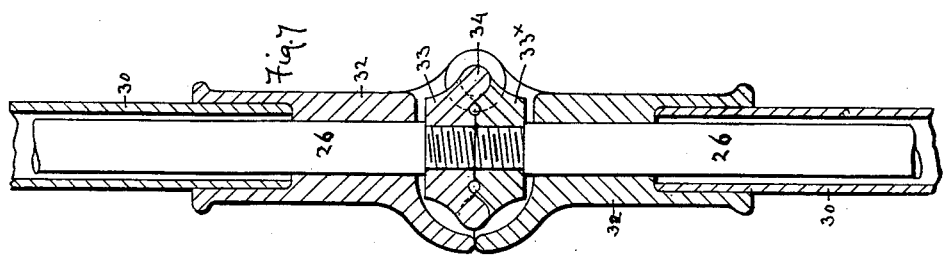
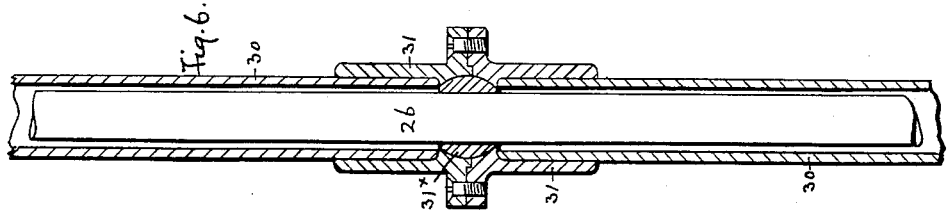
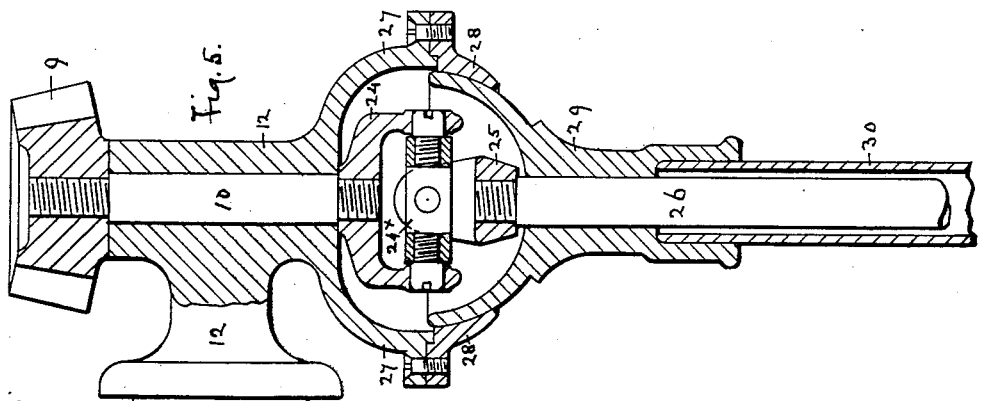
Witnesses.
Tom Taylor
A. T. Kostron
Inventor
J. W. Newall (No Model.)  J. W. NEWALL.  4 Sheets—Sheet 4.
ANIMAL CLIPPING MACHINE.
No. 541,288.  Patented June 18, 1895.
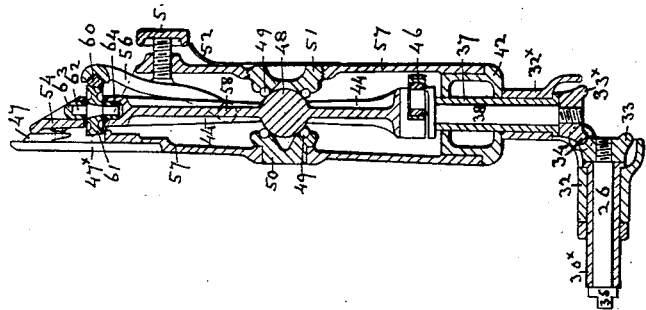
Fig. 9
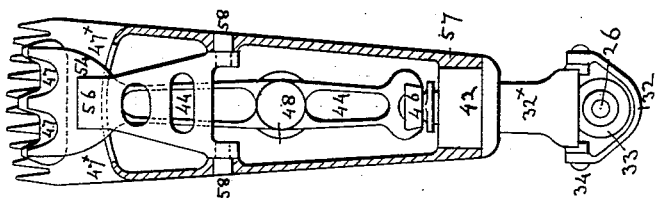
Fig. 10
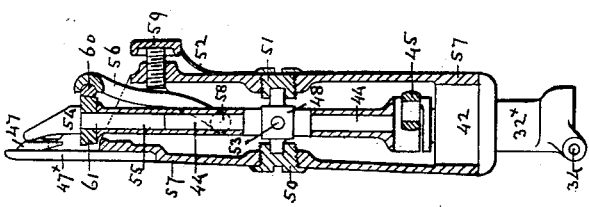
Fig. 11
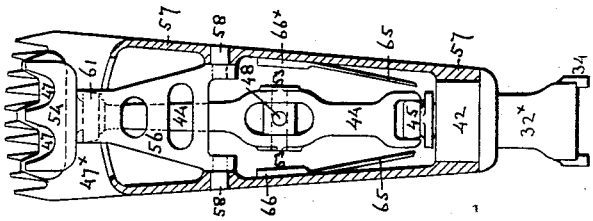
Fig. 12
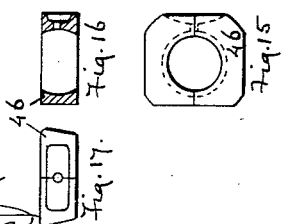
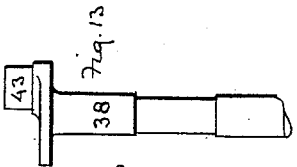

UNITED STATES PATENT OFFICE.

JOHN W. NEWALL, OF ONGAR, ENGLAND.

ANIMAL-CLIPPING MACHINE.

SPECIFICATION forming part of Letters Patent No. 541,288, dated June 18, 1895.

Application filed September 26, 1891. Serial No. 406,956. (No model.) Patented in England June 24, 1891, No. 10,750, and August 6, 1891, No. 13,332.

*To all whom it may concern:*

Be it known that I, JOHN WALKER NEWALL, of Forest Hall, Ongar, in the county of Essex, England, have invented certain new and useful Improvements in Apparatus for Shearing or Clipping Hair or Wool, (for which I have obtained Letters Patent in Great Britain, No. 10,750, dated June 24, 1891, and No. 13,332, dated August 6, 1891,) of which the following is a specification.

In this apparatus the shearing is effected by means of a cutter which is moved to and fro across a comb by a reciprocating lever; and motion is communicated to the lever by means of a flexible shaft which may be rotated either by hand or power.

Throughout this specification whenever the words "flexible shaft" are used they must be understood to refer to a compound shaft composed of sections of rigid shaft running in corresponding sections of rigid sheath the various sections of shaft and sheath being connected together as specified and claimed.

In order that the working of the apparatus may be completely explained I will describe both hand and power driving.

In my explanation I shall refer to the several drawings which accompany this specification and the same figures refer to the same parts in any drawings where they may occur.

Figure 1 is a side elevation of a complete machine embodying my improvements as arranged for driving by hand. Fig. 2 is a side elevation, partly in section, of a bearing on a main line of shafting arranged for giving motion to a shearing apparatus according to my improved method. Fig. 3 is a front view of the swinging bracket that carries the top end of the flexible shaft when arranged for driving by power. Fig. 4 is an end view of a bearing of a main-line shaft. Fig. 5 is a sectional view of a top joint of my flexible driving-shaft. Fig. 6 is a sectional view of an intermediate bearing of my flexible driving-shaft. Fig. 7 is a sectional view of an intermediate hinged joint of my flexible driving-shaft. Fig. 8 is a sectional view of a coupling of my flexible driving-shaft and of a universal-joint connection between my flexible driving-shaft and my shear. Figs. 9 and 11 are side sections, and Figs. 10 and 12 are plan sections, of shears made on my improved method. Fig. 13 shows an eccentric pin; Fig. 14, a spherical segment; and Figs. 15, 16, and 17, a sliding block, all used according to my improved method of converting the circular motion of a flexible shaft into the reciprocating motion of a lever.

Fig. 1 shows the hand driving apparatus, consisting of a base 1 carrying an upright pillar 2 to which is attached a bracket 3 carrying a pin on which revolves the fly wheel 4. The fly-wheel has a handle 5 by which it is revolved. The rim of the fly wheel is formed either into teeth or a groove and by means of a chain or rope as the case may be it drives a pinion 6 which is fixed on one end of a spindle which runs in the bracket 7 fixed to the top of the pillar. At the other end of the spindle is fixed a bevel wheel 8 which drives a bevel pinion 9 which is fixed to the top of a vertical spindle 10 which works in a bracket 12. For driving by power I arrange that a shearing apparatus can be worked from each bearing of the main shaft.

Fig. 2 shows a hanger carrying the main shaft 13. It is advisable to use a hanger of such form or design that the under side of the bearing is unobstructed. A bevel wheel 8 is fixed on the main shaft in such a position that when the swinging bracket 12 which carries the bevel pinion 9 is vertical the teeth of the wheel and pinion will be correctly in gear. The bracket 12 is pivoted to the upper part of the main bearing 18 in such a way that it can swing to and fro to the extent necessary to carry the teeth of the pinion 9 in and out of gear with the wheel 8. The bracket 12 is held firmly in either position by means of the lever 17 which is pivoted at one end to the under side of the same main bearing 18 and has notches formed at its opposite end as shown which engage with a pin 19 fixed in the bracket 12. The lever is pressed to its place by a coiled spring 20 inclosed in the recess 21. The lever may be prolonged a little beyond its pivot in order to receive a cord 22 by which it may be pulled down to release the pin. The bevel wheel 8 is generally made entirely of metal but if it is wished to run with less noise, then a wooden or compressed fiber segment is inserted as shown in Fig. 2;

or a box containing small lead shot may be attached to the wheel made entirely of metal.

In Fig. 2, 8 is the body of the wheel, which has an undercut flange 67 formed on one side of it. Up to this flange are pressed a series of wood or other suitable segments 68, one side of the root of the segments being beveled to fit against the flange while the other side is straight. A ring 69 is pressed onto the straight side of the wood blocks and kept in place by small screws or pins 70. Teeth may then be cut in the segments in the usual way. From this point all parts are the same both for power and hand driving. It will be seen that the lower part of the bracket 12 on the hand driving frame and of the swinging bracket 12 on the power drive are both enlarged in the same manner so as to form an inverted cup with a flange 27 at the bottom; also each of these brackets carries a spindle 10 to which is attached at the top end a bevel pinion 9 and at the bottom end a fork 24 which forms part of a universal joint. The other fork 25 of the universal joint forms the top of the flexible driving shaft 26. To the flange 27 is attached a flanged ring 28, which is shaped inside to form a segment of a sphere. In this hollow portion of a sphere swings a portion of a hollow ball 29 with a neck projecting downward which forms the top portion of the sheath of the flexible driving shaft 26. The cross piece $24^\times$ which forms the connection between the two forks of the universal joint of the shaft has its center at the center of the cup 28 and ball 29 which form the universal joint for the sheath and so it will be seen that the sheath can both bend out of line and turn round without interfering with the free rotation of the shaft. Into the neck of the ball 29 is fixed a light piece of tube 30 and at the other end of the tube is a hinged socket 32. Bearings are formed for the shaft in each socket and if any one length of shaft is very long one or more intermediate bearings may be provided as shown at 31. This bearing consists in a ball $31^\times$ through which the driving shaft 26 passes and which is held lightly in bearings made to receive it in sleeves secured to the adjacent ends of the two parts or lengths into which the section of sheath is divided. The hinged socket 32 is joined to a corresponding socket on the next length of sheath by means of pins 34.

Any one length of shaft drives the next length by means of two variable bevel wheels fixed to their respective ends 33, $33^\times$.

The axis of motion of the hinged sockets passes through the center of the pitch line of the bevel wheels. There may be as many sections of shaft and sheath similar to the one already described as may be necessary, but the bottom length is generally arranged as shown in Fig. 8. Close to the lower end of the bottom length is arranged a joint by means of which one shear can be quickly detached from the shaft and another one substituted. The two portions of shaft drive one another by means of the tongue 35 and groove $35^\times$ and these are prevented from coming apart by making one part of the sheath overlap the other part $30^\times$ and fastening them together by a clamp collar 36.

The piece of sheath $30^\times$ is short and has at its lower end a hinged socket 32. This hinged socket is free to turn on the sheath $30^\times$ but end motion is prevented by collars $30^{\times\times}$ and $32^{\times\times}$. The adjoining hinged socket $32^\times$ turns on the brush 37 that carries the driving spindle 38 of the shear, and is likewise prevented from end motion by collars. The shafts are connected by variable bevel wheels 33, $33^\times$ as before.

It will be readily understood that if desired the same form of joint may be employed to form the top joint of the flexible shaft as is described for connecting the bottom end of the flexible shaft to the shear.

If it is required to relieve the hand from part of the weight of the shear and shaft this may be done as shown in Fig. 1 where a cord 39 is fixed to the shaft close to the shear, and is carried over pulleys 40 fixed in any convenient way and comes down to a counterbalance weight 41; or a spring may be used instead of a weight.

The brush 37 which carries the hinged socket $32^\times$ at its outer end is at its inner end fixed into the casting 42 which forms the end of the handle of the shear. In this brush runs the driving spindle 38 having at its inner end a crank pin 43 which by its revolutions causes the lever 44 to vibrate. This crank pin may either carry a roller 45 with a rounded edge which works between the jaws of the lever 44 or it may work in a similar roller which can rock to a limited extent in a block 46 which can slide in one direction only between the jaws of the lever 44. This lever is pivoted in the handle of the shear and it is essential that the front end of the lever which is formed into a fork shall be free to adjust itself to any variation in thickness or to any irregularity of parallelism between the top and bottom of the cutter 47 without in any way interfering with the free reciprocation of the lever about the pivot 48. Two ways of effecting this result are shown, one in Figs. 9 and 10 and the other in Figs. 11 and 12.

In Figs. 9 and 10 the pivot 48 is formed as a ball on the lever, which ball works between two rings of antifriction balls 49 held in seats in the pieces 50, 51, of which 51 is adjustable by means of a screw cut on its outer edge and is locked by the spring 52. In Figs. 11 and 12 the pivot is formed as a pin 48 which works in seats in the pieces 50, 51, having its center enlarged to carry a cross pin 53 on which the lever 44 which is here formed into an eye can rock in a vertical direction. It is obvious that the same result can be obtained by making the pivot larger still in the middle and pivoting the lever inside it. To provide for a motion of the front fork about the longitudinal axis of the lever 44 the lever is cut short and the front end is bored out, the fork being made as a separate piece with a round shank 55 which turns freely in the hollow end of the lever, but is prevented from coming out by a pin.

The cutters may be made of any form for any special purpose but for shearing sheep it is advisable to make the lower cutter $47^\times$ in the form of a comb of many teeth while the upper cutter has three or four teeth only. The top cutter is driven to and fro across the bottom one by means of two pins on the underside of the vibrating lever which fit into two holes in the cutter.

In order to make a clean cut it is necessary for the cutters to be pressed together with some force. This is applied by means of the hinged lever 56 which is pivoted to the frame 57 at 58 and can be forced down to any required extent by the screw 59 which is locked by the spring 52. The front end of this lever carries a steel race plate 60 which can rock slightly in a semicircular seat as shown. This plate is coned on its bottom face so as to match the coned roller 61.

It will be seen that owing to the coning and to the power of rocking in its seat the face of the race plate will always bear fully on the rim of the roller whether the lever 56 be above or below its normal position.

In Figs. 9 and 10 the antifriction roller 61 is carried on a journal 62 which works in two small bushes 63 and 64 inserted in the lever as shown; and in Figs. 11 and 12 the roller is carried on the shank 55 of the fork 54. Now when the lever 56 is forced down by the screw 59 the plate 60 presses on the roller 61 and pressure is transmitted through the lever 44 to the cutter 47. The extreme lower front edges of the three fingers that form the front of the lever 44 are so curved as to form part of the same segment of a straight cylinder, or in other words so as always at their points of contact to be on or form part of a straight line in two planes at right angles to each other, so that provided the top of the cutter 47 is a plane surface each of the fingers will press on it with equal force however (within limits) the cutter and lever may be inclined to one another.

Sometimes I use springs to cushion the ends of the throw of the lever 44, and a convenient way to fix them is shown in Fig. 12 where two flat springs 65 are fixed to the frame at 66, $66^\times$ and have their free ends of such length and in such a position that they come in contact with and so cushion the lever 44 at the extremities of its stroke.

Having now described the nature of my invention and in what manner the same is to be performed, I declare that what I claim is—

1. The rotary spindle 38 immediately connected with the cutting mechanism, the bearing-sleeve 37 therefor, and the swiveled socket $32^\times$ rotatively mounted upon said bearing-sleeve but longitudinally immovable thereupon, in combination with the terminal sheath-section $30^\times$, the shaft-section 26 located and turning therewithin, the swiveled socket 32 rotatively mounted on said sheath-section and longitudinally immovable thereupon, said socket 32 being hinged to said socket $32^\times$, and variable bevel-gears between said shaft-section 26 and said spindle 38, located within said sockets 32 and $32^\times$, substantially as set forth.

2. The stationary, rigid sheath, composed of at least two parts or lengths having a spherical concave interior bearing at the adjacent ends of said parts or lengths, in combination with a ball having a longitudinal bore, said ball being located in said spherical bearing, and a section of a drive shaft extending freely through the longitudinal bore of said ball, whereby an intermediate bearing is formed for said shaft, substantially as set forth.

3. The combination of the movable shear cutter, the reciprocating lever for actuating the same, said lever having a spherical pivot, and a bearing for said pivot in the shear frame, composed of cups or rings of antifriction balls, substantially as set forth.

4. In an animal shear, the vibrating lever, a presser therefor, and a rocking race-plate between said lever and presser, in combination with the comb and cutter plates co-operating therewith, substantially as set forth.

5. In an animal shear, the vibrating lever, a presser therefor, said presser having a seat circular in cross-section, and a rocking race-plate fitting in said circular seat and turning therein, said race-plate co-acting with said vibrating lever or a part thereof, in combination with the comb and cutter plates co-operating therewith, substantially as set forth.

6. In an animal shear, a pivoted lever, a roller thereon having a conical working surface, and a race-plate having a conical face upon which said roller travels, in combination with the comb and cutter plates co-operating therewith, substantially as set forth.

7. In an animal shear, a pivoted lever, a roller thereon having a conical working surface, a race-plate having a conical face upon which said roller travels, and means for applying pressure to said race-plate and thence to the lever, in combination with the comb and cutter plates co-operating therewith, substantially as set forth.

8. In an animal shear, the lever, the conical roller thereon, the pressure lever having a circular seat, and a loose race-plate fitting said circular seat and having its face coned to fit said roller, in combination with the comb and cutter plates co-operating therewith, substantially as set forth.

Dated this 15th day of September, 1891.

JNO W. NEWALL.

Witnesses:
R. I. ROSTROW,
TOM. TAYLOR.